(12) United States Patent
Shenk (10) Patent No.: US 6,935,435 B1
(45) Date of Patent: Aug. 30, 2005

(54) POSITIONABLE CULTIVATING APPARATUS FOR RAISED BED CROPS

(76) Inventor: John E. Shenk, 911 Disston View Dr., Lititz, PA (US) 17543

( * ) Notice: Subject to any disclaimer, the term of this patent is extended or adjusted under 35 U.S.C. 154(b) by 0 days.

(21) Appl. No.: 10/992,581

(22) Filed: Nov. 18, 2004

Related U.S. Application Data (60) Provisional application No. 60/523,980, filed on Nov. 21, 2003.

(51) Int. Cl.$^7$ .......................... A01B 15/20; A01B 7/00; A01B 35/32
(52) U.S. Cl. ...................... 172/600; 172/654; 172/656; 172/582
(58) Field of Search ................................ 172/576, 582, 172/603, 600, 595, 584, 587, 654–656, 667, 172/673

(56) References Cited

U.S. PATENT DOCUMENTS

| | | | | |
|---|---|---|---|---|
| 2,635,367 | A | * | 4/1953 | Piel et al. .................... 172/388 |
| 4,183,413 | A | * | 1/1980 | Boston ........................ 172/646 |
| 4,271,912 | A | * | 6/1981 | Frye ............................ 172/441 |
| 4,391,051 | A | * | 7/1983 | Bachler ....................... 37/223 |
| 5,394,945 | A | * | 3/1995 | Desmarais ................... 172/98 |
| 5,462,123 | A | * | 10/1995 | Harlan et al. ............... 172/454 |
| 5,878,821 | A | * | 3/1999 | Flenker et al. .............. 172/569 |
| 5,915,481 | A | * | 6/1999 | Flenker et al. .............. 172/166 |
| 6,612,381 | B2 | * | 9/2003 | Powell et al. ............... 172/586 |
| 6,698,525 | B2 | * | 3/2004 | McFarlane .................. 172/145 |

* cited by examiner

Primary Examiner—Robert E. Pezzuto
Assistant Examiner—Alexandra K. Pechhold
(74) Attorney, Agent, or Firm—Miller Law Group, PLLC (57) ABSTRACT

A cultivating implement has transversely opposing sub-frames slidably mounted in the main frame of the implement to permit lateral positional adjustment of work implements carried by the sub-frames. The work implements are supported by a mounting apparatus providing a tilt adjustment, a horizontal rotational adjustment, and a transverse spacing adjustment for each respective work implement. A tilt control plate limits the transverse tilting movement of the work implement, while a rotation control plate limits the rotational movement of the work implement in a horizontal plane. A rotatable powered brush attachment can be supported on the sub-frame to provide a gentle cultivating action for the edges of plastic material covering the crop row. A pivot linkage operated through a hydraulic actuator provides simultaneous lateral movement of the opposing sub-frames to affect selective positional adjustment of the work implements. The frame is pivoted to the hitch to offset side hill operation.

20 Claims, 9 Drawing Sheets

POSITIONABLE CULTIVATING APPARATUS FOR RAISED BED CROPS

CROSS-REFERENCE TO RELATED APPLICATIONS

This application claims domestic priority on U.S. provisional patent application Ser. No. 60/523,980 filed Nov. 21, 2003, the contents of which are hereby incorporated herein by reference.

BACKGROUND OF THE INVENTION

The present invention is directed to a tillage apparatus for agricultural crops and, more particularly, to a cultivating apparatus having positionally adjustable cultivators that enhance the cultivation of crops in raised beds.

Berry crops, as well as some vegetable crops like potatoes, are typically grown on raised beds extending in a linear manner along a field. Perennial crops, such as strawberries and blueberries, are often grown on a plastic covered bed with plants arranged in rows across the field. When raised bed crops are grown on a hillside, as opposed to being grown on a generally flat field, the cultivation of the crops, i.e. eliminating the weeds along and between the rows of crops, often results in soil being mounded on only one side of the raised bed, as the soil being moved by the cultivators on the lower side of the raised bed normally is not moved uphill.

Width adjustment for the working width of the tillage apparatus has a specific advantage in cultivating raised bed crops. The cultivators can be positioned to work close to the row of crops without disturbing the plants or their roots structure. Furthermore, it is desirable to move soil onto the raised bed to ridge the soil slightly. Rolling cultivators, i.e. tined devices that are rotatably supported in a sub-frame to rotate with their movement over the surface of the ground, are not powered and will gently disrupt weeds and displace a small amount of soil. This movement of soil is particularly advantageous when the raised bed is covered in plastic, as the soil being ridged will cover the edge of the plastic and help retain the integrity of the plastic covering. Clearly, in operating such tillage implements, it is necessary that the rolling cultivators not actually engage the plastic as the cultivators will tear the plastic and disrupt the raised bed structure. Since the width of the raised bed, as well as the plastic covering the raised bed, can vary along the row, it is imperative that the cultivators be worked cautiously in order to provide effective results.

Accordingly, it would be desirable to provide a tillage implement having rolling cultivators that are positionally adjustable to provide variable width of operation, as well as improved soil-moving capabilities when working in side hill conditions. It would also be desirable to provide a cultivating apparatus that can be effectively utilized with plastic covered raised bed crops.

SUMMARY OF THE INVENTION

It is an object of this invention to overcome the aforementioned disadvantages of the prior art by providing a cultivating implement having multiple modes of positional adjustment for the working implements carried by the implement.

It is another object of this invention to provide a cultivating implement that has hydraulic lateral adjustment of the work implements supported on the frame of the implement.

It is a feature of this invention that the frame of the cultivating implement incorporates slidable sub-frames that are operatively connected to hydraulic actuators to effect lateral adjustment of the position of the work implements mounted on the sub-frames.

It is an advantage of this invention that variations in crop spacing can be accommodated through lateral hydraulic positioning of work implements carried by a cultivator.

It is another feature of this invention that work implements can be selectively positioned in three orientations with respect to crops being cultivated.

It is another advantage of this invention that the cultivator is particularly usable in conjunction with raised bed crops.

It is still another advantage of this invention that the cultivator is particularly usable in conjunction with row crops planted with a plastic cover to reduce weed growth around the crop.

It is still another feature of this invention that each work implement is supported from a sub-frame by a mounting mechanism incorporating a tilt adjustment, a rotational adjustment, and a lateral spacing adjustment.

It is yet another feature of this invention to provide a pivot linkage through which a single hydraulic actuator can affect movement of opposing sub-frames simultaneously.

It is still another object of this invention to provide a rotatable brush attachment for use in conjunction with rolling cultivating work implements to dislodge weeds adjacent the edge of plastic covering for row crops.

It is yet another advantage of this invention that individual work implements can be individually positionally adjusted to provide different cultivating action with respect to the row crop.

It is yet another feature of this invention to provide a pivoted connection between the main frame of the cultivating implement and the three-point hitch mounting apparatus.

It is a further advantage of this invention that the pivotal movement of the main frame of the cultivating implement compensates for side hill operation of the implement.

It is a further feature of this invention that the sub-frames are slidably received in forward and rearward transverse frame members to allow for lateral movement of the work implements mounted on the sub-frames.

It is still another advantage of this invention that the cultivating implement can be moved from one field to another, from one crop to another, and from one spacing of a crop to another without requiring manual re-positioning of the work implements, thus saving operating time.

It is a further object of this invention to provide a laterally adjustable cultivating implement that is durable in construction, inexpensive of manufacture, carefree of maintenance, facile in assemblage, and simple and effective in use.

These and other objects, features and advantages are accomplished according to the instant invention by providing a cultivating implement having transversely opposing sub-frames slidably mounted in the main frame of the implement to permit lateral positional adjustment of work implements carried by the sub-frames. The work implements are supported by a mounting apparatus providing a tilt adjustment, a horizontal rotational adjustment, and a transverse spacing adjustment for each respective work implement. A tilt control plate limits the transverse tilting movement of the work implement, while a rotation control plate limits the rotational movement of the work implement in a horizontal plane. A rotatable powered brush attachment can be supported on the sub-frame to provide a gentle cultivating action for the edges of plastic material covering the crop row. A pivot linkage operated through a hydraulic actuator provides simultaneous lateral movement of the opposing sub-frames to affect selective positional adjustment of the work implements. The frame is pivoted to the hitch to offset side hill operation.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Referring to the FIGS. 1–4, a first embodiment of a tillage implement, also referred to as a cultivator, incorporating the principles of the instant invention can best be seen. The tillage implement 10 has a main frame assembly 12 adapted with a conventional three-point hitch mechanism 11 for connection to a prime mover, such as the tractor T, which is operable in a conventional manner to raise and lower the implement 10 into engagement with the ground G. The main frame 12 is preferably formed in a box-like configuration with a forward transverse frame member 13 and a rearward transverse frame member 14 which are interconnected by transversely spaced longitudinal end frame members 16, and preferably a pair of internal longitudinal frame members 17 for purposes of stability of the main frame 12.

The implement 10 further includes transversely spaced box-like sub-frames 15 that are slidably received within the forward and rearward transverse frame members 13, 14, as will be described in greater detail below. Each sub-frame 15 has supported thereon work implement mounting apparatus 20 at both forward and rearward positions so as to mount a pair of positionable work implements 35 for engagement with the ground to effect a cultivating operation. The work implements 35 can be of one of several known ground engaging cultivating devices, such as disc coulters (or notched disk blades) 37 shown in FIG. 1 and at the forward location in FIG. 3, rolling cultivator spider tines 38 as shown at the rearward location in FIG. 3, or even spring cultivator tines 39 such as is optionally shown in the center position in FIG. 3. The ground engaging work implements 35 work the surface of the ground in a conventional manner to dislodge weeds and other undesirable growth between the raised bed rows of crop.

Figure 1:
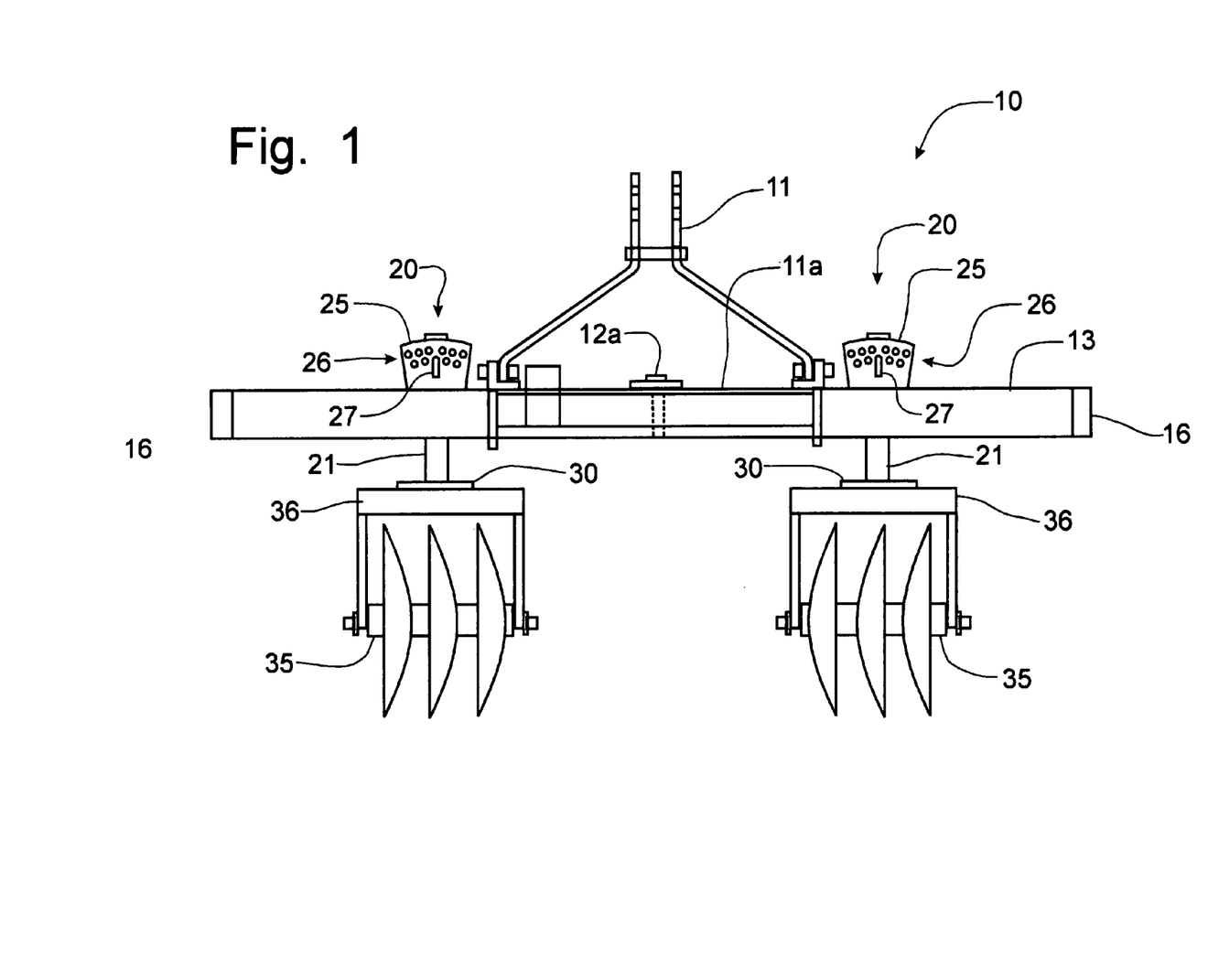
FIG. 1 is a front elevational view of a cultivator apparatus incorporating the principles of the instant invention, the cultivator being of the type for mounting to the three-point hitch at the rear of a tractor.
Figure 2:
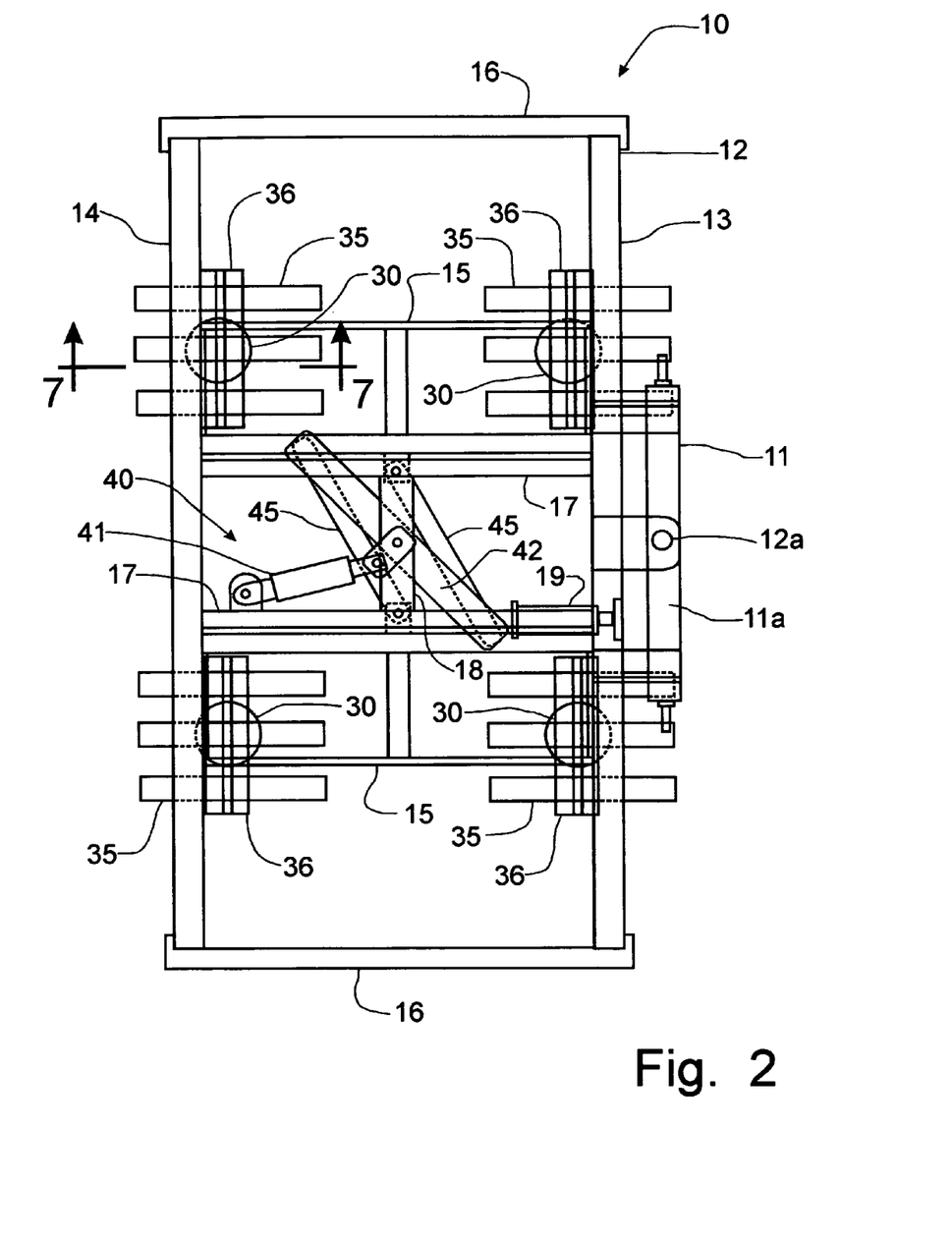
FIG. 2 is a top plan view of the cultivator apparatus depicted in FIG. 1, the linkage for moving the sub-frames being oriented to pull the work implements to an innermost position with respect to the centerline of the apparatus.
Figure 3:
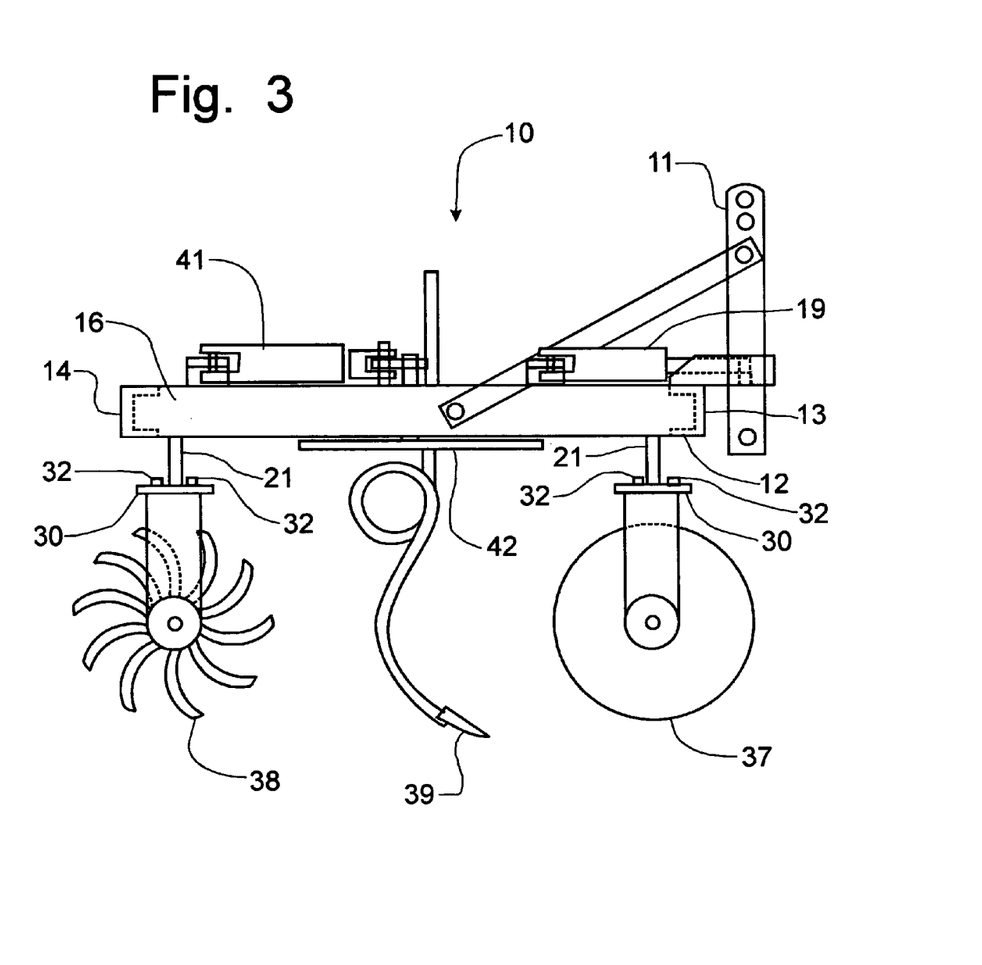
FIG. 3 is a right side elevational view of the cultivator apparatus shown in FIGS. 1 and 2 with an optional center spring tine being depicted between coulters at the front of the cultivator apparatus and rolling cultivator tines located at the rear of the cultivator apparatus.
Figure 4:
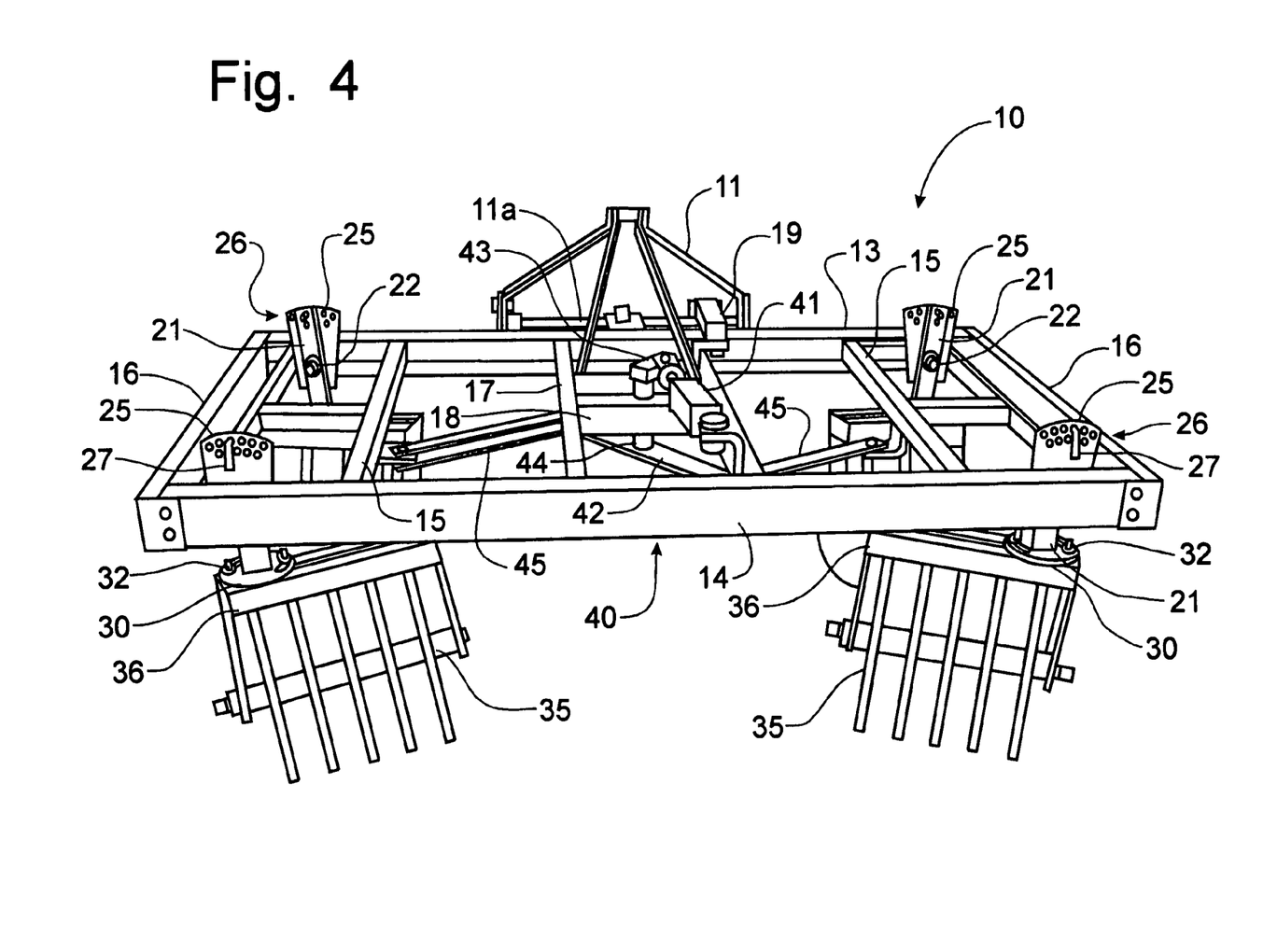
FIG. 4 is a rear perspective view of the cultivator apparatus shown in FIGS. 1–3 with the rearwardly positioned work implements being tiled and adjustably positioned inwardly on the work implement mount.

Preferably, the main frame 12 can be pivotally connected to the three-point hitch mounting apparatus 11 with the forward transverse frame member 13 being attached to a horizontal portion 11a of the mounting apparatus 11 by a vertical pivot 12a. A hydraulic cylinder 19 interconnecting the forward frame member 13 and the horizontal portion 11a of the hitch mounting apparatus 11 provides stability for the connection between the frame 12 and the mounting apparatus 11, as well as controls the pivotal movement of the frame 12 relative to the mounting apparatus 11 that is connected to the three-point hitch structure of the prime mover (not shown). By manipulating the length of the hydraulic cylinder 19, the entire main frame 12 could be positioned at an angle to the direction of travel to offset movement of the tillage implement 10 during side hill conditions.

The implement mounting apparatus 20 includes an upright mounting member 21 pivotally supported on the sub-frame, at the forward and rearward locations, respectively, for pivotal movement about a horizontal, longitudinally extending pivot axis 22 about which the upright mounting member 21 is positionally supported for movement relative to the sub-frame 15. Since each upright mounting member has mounted thereon a work implement 35, each respective work implement 35 is positionally movable to be angled in a manner to increase the ridging function of the work implement, as will be described in greater detail below. The implement mounting apparatus 20 also includes a tilt control plate 25 affixed to the sub-frame 15 at each of the forward and rearward positions to be co-operable with the upright mounting member 21 to control the pivoted position thereof.

Figure 8:
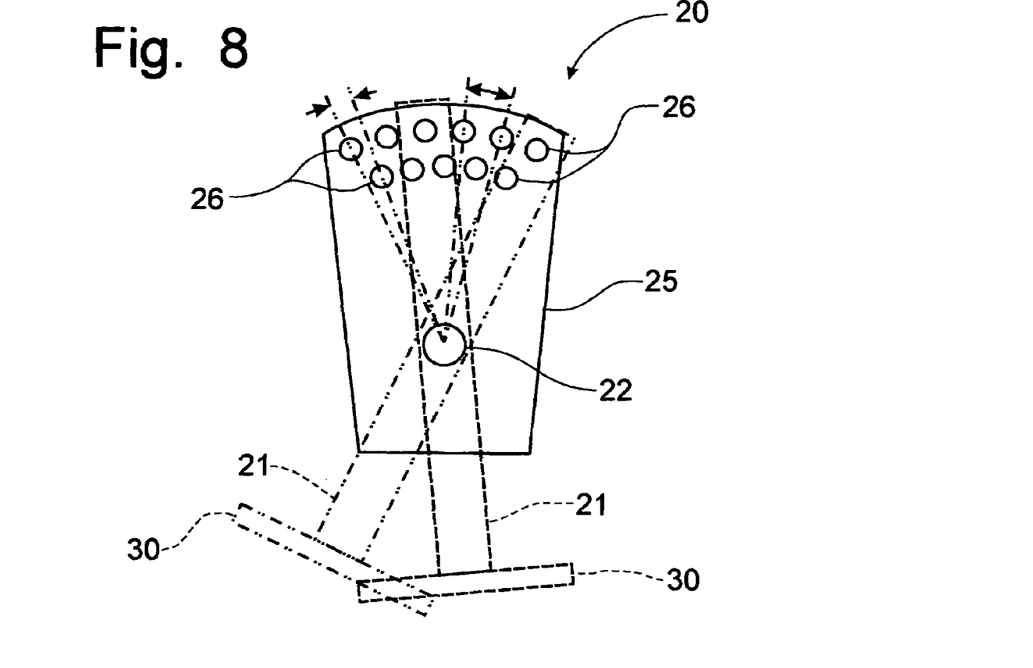
FIG. 8 is an enlarged elevational detail view of the tilt control plate forming part of the work implement mounting apparatus.

As best seen in FIGS. 1 and 8, each tilt control plate 25 is formed with a plurality of spaced apertures 26 at an upper portion thereof to be co-operable with a pin 27 or other fastener or locking device that is inserted through a corresponding opening 23 in the upright mounting member 21 and an aligned aperture 26 in the tilt control plate 25. Preferably, the apertures 26 are positioned on the tilt control plate 25 to correspond to a discrete number of degrees of pivotal movement of the upright mounting member 21. For example, the angular deflection from an aperture 26 on the top row and the next aperture 26 on the second row would preferably be approximately 5 degrees of pivotal movement, as is depicted on FIG. 8. Therefore, the angular deflection between adjacent apertures 26 in one row would be ten degrees.

The mounting member 21 has mounted at the bottom end thereof a rotational control plate 30 from which the work implement 35 is supported. As seen in FIGS. 1–4, 8 and 9, the rotational control plate 30 has a pair of arcuate slots 31 formed on opposing sides of the upright mounting member 21 and having a center of curvature that corresponds to the upright mounting member 21 such that the work implement is rotatably movable about a generally vertical pivot axis corresponding to the upright mounting member 21. Preferably, the rotational control plate 30 is laser-cut with indicia tips 33 formed on the outer periphery to indicate rotated position. Preferably, each indicia tip 33 would indicate a ten degree rotation.

Figure 9:
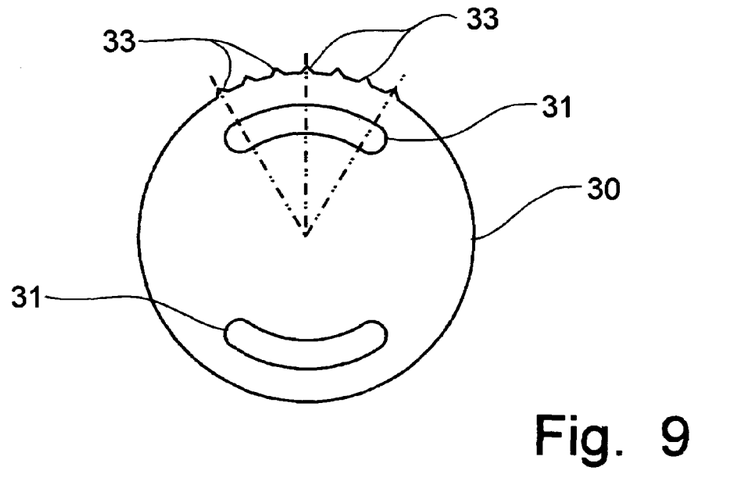
FIG. 9 is an enlarged top plan view of a rotational control plate forming part of the work implement mounting apparatus.

Fasteners 32 passing through the slots 31 support the respective work implements 35 from the rotational control plate 30. By loosening the fasteners 32, the work implement 35 can be rotated about the generally vertical pivot corresponding to the upright mounting member 21 to orient the work implement 35 obliquely to the direction of travel so as to vary the aggressiveness of the work implement 35 with respect to engagement with the surface of the ground G. One skilled in the art will recognize that the slots 31 in the rotational control plate 30 could instead be a series of arcuately arranged apertures cooperable with the fastener 32. Furthermore, by forming the work implement 35 with a slotted frame 36 to secure the fasteners 32, one skilled in the art will recognize that the slotted frame 36 can be slid along the fasteners to provide further width adjustment for the working width of the transversely spaced sets of work implements 35.

The lateral sliding movement of the sub-frames 15 relative to the main frame 12 is accomplished by a pivot linkage 40 operated by a hydraulic cylinder 41 anchored on the main frame 12, specifically on one of the interior longitudinal frame members 17. The pivot linkage 40 permits both transversely opposed sub-frames 15 to be moved simultaneously for varying the operative width adjustment, as will be described in greater detail below. The pivot linkage 40 includes a central pivot link 42 rotatably supported in a cross frame member 18 extending between the two interior longitudinal frame members 17. Preferably, the central link member 42 is located below the cross frame member 18 and is rotatably moved through an actuator member 43 that is affixed to a pivot shaft 44 with the central pivot link 42 such that movement of the actuator member 43 effects a corresponding movement of the central pivot link 42.

Figure 5:
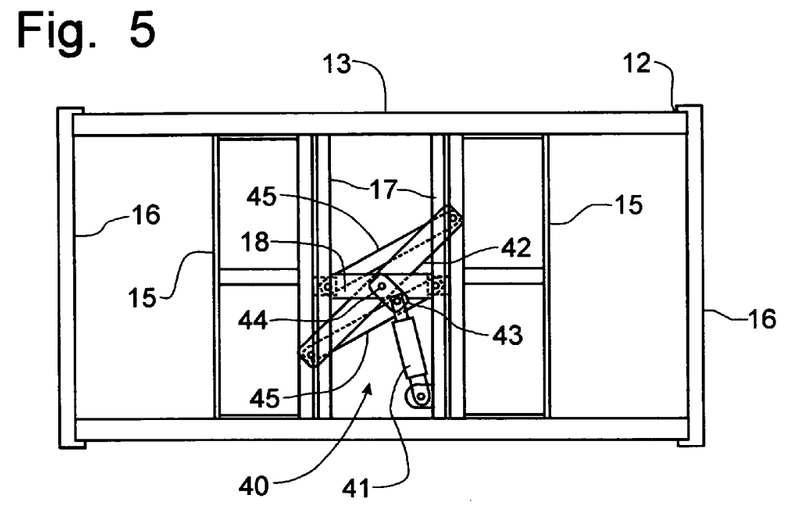
FIG. 5 is a schematic top plan view of the cultivator apparatus depicting the actuating linkage oriented as shown in FIG. 2 to position the sub-frames to an inwardmost position.
Figure 6:
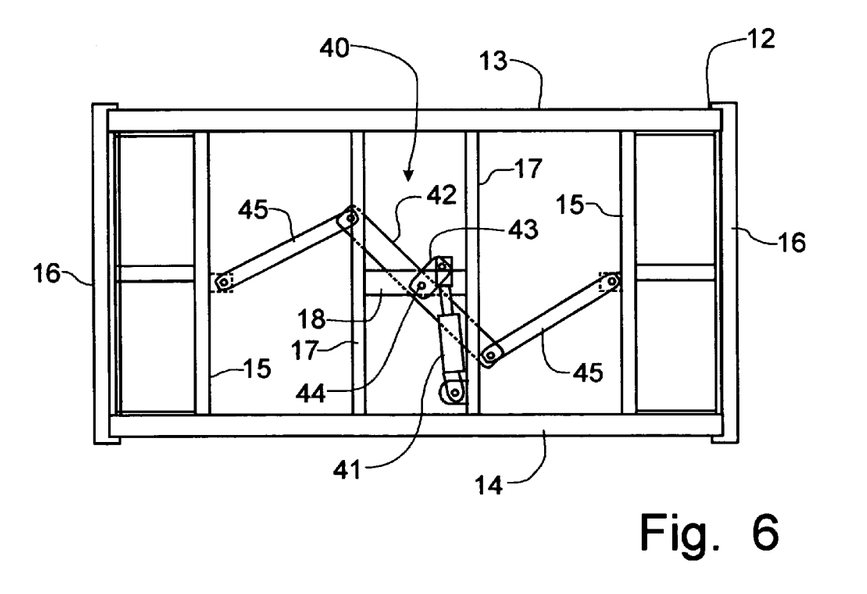
FIG. 6 is a schematic top plan view similar to that of FIG. 5, but with the actuating linkage oriented to locate the transversely spaced sub-frames to an outwardmost position.

The hydraulic cylinder 41 operatively connects to the actuator member 43 above the cross frame member 18. Lateral pivot links 45 interconnect the central pivot link 42 and the respective sub-frames 15. As can be seen through comparison of the respective positions of the sub-frames 15 and the components of the pivot linkage 40 in FIGS. 5 and 6, the rotation of the central pivot link 42 through extension of the hydraulic cylinder 41 causes the lateral movement of the sub-frames 15 carrying the work implements 35, thus varying the lateral spacing between the opposing work implements 35. Therefore, with a single movement of a hydraulic control lever (not shown) the operative work spacing of the tillage implement 10 can be effectively adjusted and even adjusted while being operated, on-the-go.

Figure 7:
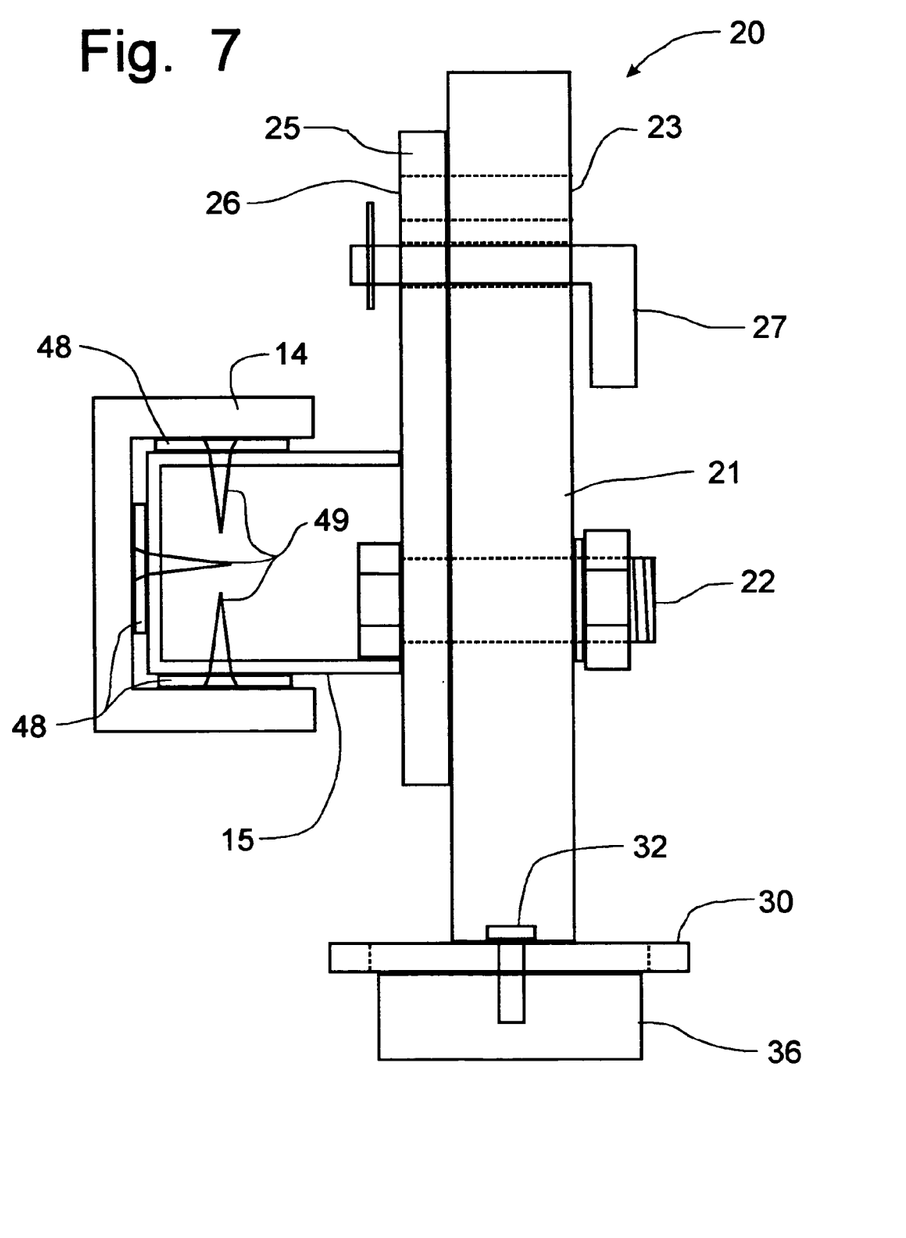
FIG. 7 is an enlarged schematic partial cross-sectional view of the mounting of the sub-frame for sliding movement within the main frame of the cultivator apparatus, corresponding to lines 7—7 of FIG. 2.

The sub-frames 15 are preferably moved laterally within the confines of the main frame 12 with the end frame members 16 providing the limit for the lateral movement of the sub-frames 15 and the work implements 35 mounted thereon. The specific preferred structure for the support of the sub-frames 15 within the forward and rearward transverse frame members 13, 14 can best be seen in FIG. 7. The description of the support of the sub-frame 15 in the rearward frame member 14 is essentially identical to that for the forward frame member 13, though only the rearward relationship is shown in FIG. 7 and will be described herein.

The sub-frame 15 has mounted thereon low friction slide plates 48, such as UHMW blocks, to be positioned between the sub-frame 15 and the forward and rearward transverse frame members 13, 14, respectively. The slide plates 48 are preferably mounted by countersunk fasteners 49 on all sides of the sub-frame 15 coming into contact with the C-shaped channel frame members 13, 14. One skilled in the art will recognize that the UHMW blocks could be attached to the channel frame members 13, 14 instead of to the sub-frame 15; however, the entire length of movement within the channel frame members 13, 14 would have to be covered with the slide plates 48, instead of just the smaller sub-frame members 15.

Figure 10:
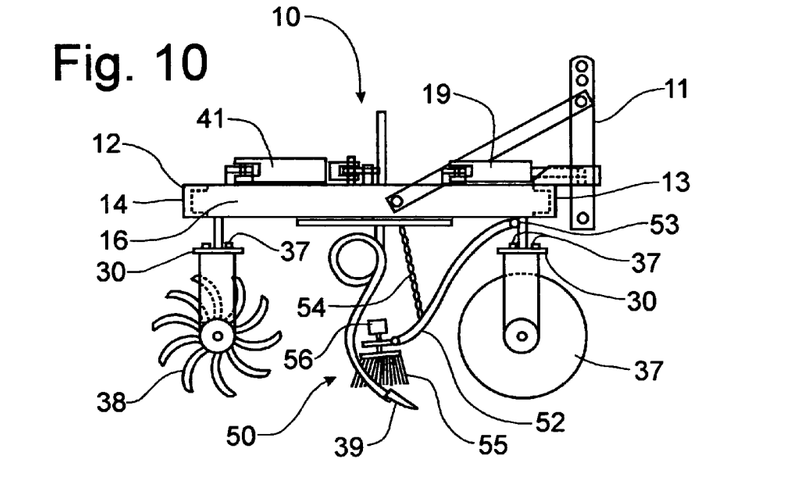
FIG. 10 is a side elevational view of the cultivating apparatus similar to that of FIG. 3, but incorporating an optional brush cultivating device for use in cultivating plastic covered raised bed crops.
Figure 11:
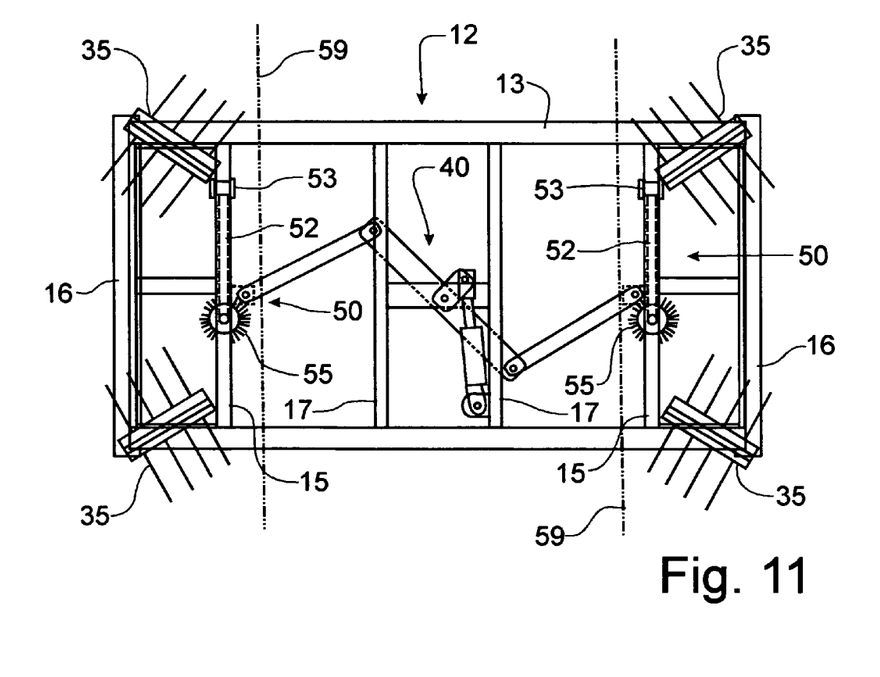
FIG. 11 is a top plan view of the cultivating apparatus shown in FIG. 10.

As can be seen in FIG. 10, an optional spring cultivator tine 39 can be mounted at an intermediate location on the sub-frame 15 between the forward and rearward work implements 35. The tines 39 serve to loosen the soil behind the tires of the tractor T to minimize compaction of the soil. Another optional cultivating device can be supported on the sub-frame 15 between the forward and rearward work implements 35, such as a rotating brush attachment 50. As can be seen in FIGS. 10 and 11, the brush attachment 50 is mounted on the respective sub-frames 15 at the innermost side thereof by a support link 52 pivotally connected to the sub-frame 15 by a pivot member 53. At the distal end of the support link 52, the brush member 55 is rotatably mounted. A hydraulic motor 56, operatively connected to the hydraulic system of the prime mover (not shown) through appropriate and conventional conduits (not shown) provides rotational power for the brush member 55. A flexible link 54 can be adjusted to limit the downward position of the brush member 55 so that the rotated brush member 55 can be positioned to gently brush over the edge 59 of the plastic covering the raised bed to remove any weeds growing at the edge of the plastic, while the work implements 35 in front of and behind the brush member 55 dislodge weeds in the path between adjacent raised beds and mound dirt onto the edge of the plastic covering.

Figure 12:
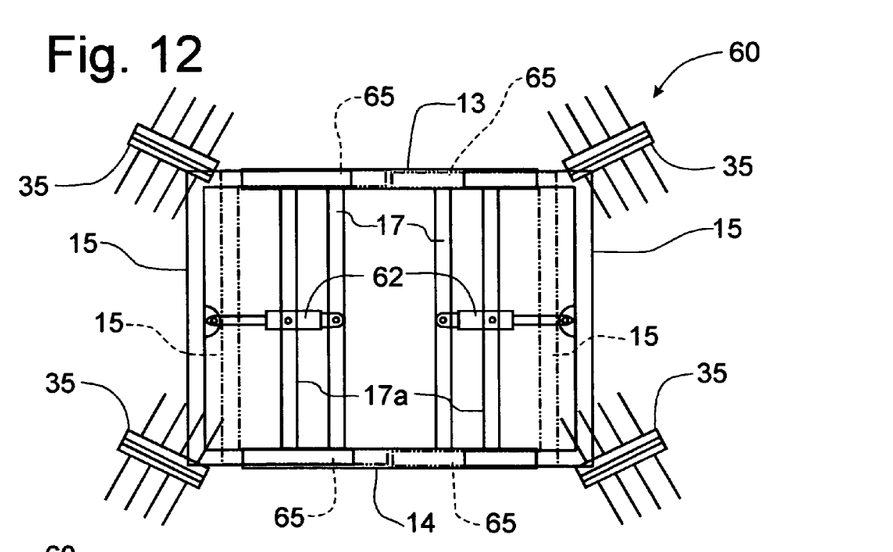
FIG. 12 is a top plan view of an alternative embodiment of the instant invention with the sub-frames positioned at an inwardmost position, the sliding movement of the sub-frames being depicted in phantom, the hydraulic actuators being depicted in a configuration for a first range of movement of the sub-frames.
Figure 13:
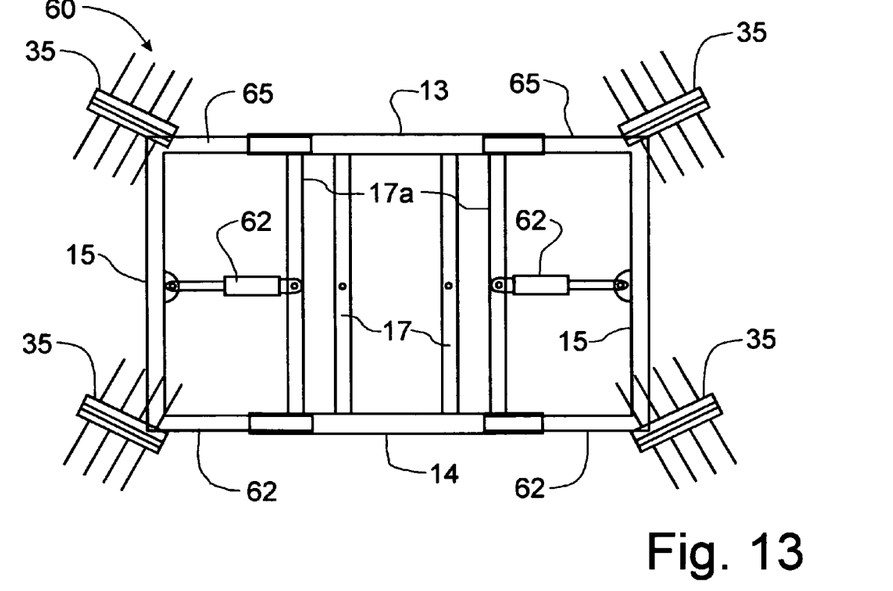
FIG. 13 is a top plan view of the alternative embodiment depicted in FIG. 12, but with the hydraulic actuators being depicted in a second configuration for a second range of movement of the sub-frames, which are positioned at an outwardmost position.

An alternative embodiment 60 for the movable sub-frames 15 can be seen in FIGS. 12 and 13. The pivot linkage 40 is not present and is replaced by a pair of hydraulic cylinders 62 which are anchored on the interior longitudinal frame members 17 and oriented laterally to directly move the sub-frames 15, which would carry the work implements 35 as described above. A first range of lateral movement for the sub-frames 15 could be obtained from a first mounting position of the hydraulic cylinders 62 on the interior longitudinal frame members 17, as is seen in FIG. 12, while a second range of movement generally outboard of the first range of movement could be obtained from a second mounting position of the hydraulic cylinders 62 on the exterior longitudinal frame members 17a, as is seen in FIG. 13. Rather than the sub-frames 15 being contained within the main frame 12, the sub-frames 15 can be formed as U-shaped members having laterally extending leg members 65 that are received telescopically within the forward and rearward transverse frame members 13, 14, which would preferably be formed as a tube or a box-like structure. The leg members 65 can be formed in an I-beam shape to be engaged with UHMW blocks fixed inside of the transverse frame members 13, 14 to slide on the UHMW blocks with minimal friction.

In operation, the respective sub-frames 15 in the alternative implement 60 could be positionally adjusted on-the-go independently of the other sub-frame 15 to provide great flexibility in the positioning of the respective work implements 35 as is described below. Because of the amount of movement permitted to the sub-frames 15 and practical limitations on the size of hydraulic cylinders 62, two ranges of movement would be preferable. Generally in operation, the lateral movement of the work implements 35 is relatively minimal so that the positioning of the hydraulic cylinders 62 would normally be done to correspond to the row spacing of the raised bed crops being cultivated.

A two-row configuration can be provided simply by mounting optional longitudinally spaced sets of work implements 35 at the center of the forward and rearward transverse frame members 13, 14. Thus, the side members 20 will serve to adjust lateral spacing between the side sets of work implements 35 and the center set of work implements 35.

Referring now to FIGS. 1–13, the hydraulic width adjustment allows for close cultivation of raised beds of crops, such as vegetable beds, strawberries and blueberries, even in plastic culture. In the alternative embodiment 60, a narrow frame of 33 inches can be adjusted to effect cultivation of a narrow row setting for the crops of between 10 inch spacing and about 45 inch spacing. A wide frame of 45 inches is more appropriately used for wider crop beds and would be capable of providing an adjustment range of between a twenty-inch spacing and a fifty-nine-inch spacing.

In operation, the implement 10 is placed over the row of crop, typically straddled by the tractor (not shown). The individual work implements 35 are oriented relative to the horizontal pivot axis 22 and the vertical pivot axis 21, both by laterally moving the work implement relative to the upright mounting member 21 and by rotating the work implement 35 relative to the rotational control plate 30, and locked into the desired orientation by tightening the fasteners 32 and by pinning the upright mounting member 21 to the desired aperture 26 in the tilt control plate 25. As noted above, the orientation of the individual work implements 35 is selected to provide the desired aggressiveness with respect to the surface of the ground G and to affect a desired amount of soil displacement laterally toward the row of crop for a ridging effect.

The work implements 35 are then moved over the surface of the ground whereupon the rolling action of the coulters 37 or the spider tines 38 dislodges weeds and moves soil as desired. Lateral adjustment of the sub-frames 15 through actuation of the hydraulic cylinder 41 (or in the alternative embodiment 60, by the hydraulic cylinders 62) can be used to manipulate the position of the work implements 35 to position them closely to the rows of crop without engaging the plastic cover of the raised bed. A rotating brush attachment 50 can also be utilized to remove weeds close to the plastic cover without disrupting the integrity of the plastic cover.

This cultivator 10 can provide up to three modes of cultivating, a disk cultivator 37 for cutting through heavy trash, a coil tine or s-tine 39 for deeper cultivating to remove some of the compaction produced by tractor wheels, and the rolling spider cultivator tines 38 for final weed uprooting and soil leveling. The aggressiveness of the work implements 35 is adjustable through the changing of the angle of movement thereof through the soil as the work implements 35 operate. The depth of the coil tine 39 can also be made adjustable by controlling the vertical position thereof relative to the sub-frame 15 on which the spring tine 39 is mounted to correspond to differing soil conditions.

The use of hydraulic cylinders 41, 62 for the positioning of two sub-frames 15 carrying laterally positionable work implements 35 is unique in such commercial cultivators. Very close cultivation of the soil relative to the raised bed of crops can be achieve by adjusting the width between the two sub-frames 15 reducing the need to get off the tractor and use a wrench for manual adjustment. This lateral positional adjustment of the work implements 35 is especially important when the cultivator 10 is used for removing weeds along the edge of black plastic mulch covering the raised bed. The use of strips of black plastic mulch has increased in use as a means of controlling weeds directly around vegetable and strawberry plants. This practice is also utilized in organic farming where plastic helps to eliminate herbicide use.

An additional issue is the need for cultivating carefully along the edge of plastic, particularly with organic crops where herbicides are not used. The rolling tined cultivators 38, where the lateral positional adjustment can be utilized to control the proximity of the work implement 35 relative to the edge of the plastic does a good job in removing weeds in such an application. However, improved cultivation of the weeds at the edge of the plastic cover can be obtained through use of the hydraulically driven, stiff bristled brush attachment 50 mounted on the sub-frame 15. The brush attachment 50 does the final removal of small weeds in the range of one or two inch from the plastic material. The brush attachment 50 is also capable of moving a small amount of soil and shallow rooted weeds without causing damage to the plastic cover.

Hydraulic width adjustment of work implements 35 on a cultivating implement 10 is also favorably utilized on vegetable or berry farms of smaller acreage. In such farming operations, several different crops might be cultivated in the same day. Operating time can be saved when moving between fields of different crops and/or moving between fields of different soil types by positionally adjusting the work implements 35 to conform to the spacing of the row crops. Sixteen inches of lateral movement of each hydraulically positionable sub-frame 15 yields a total of thirty-two inches of hydraulic width adjustment for the overall machine 10. This amount of lateral positional movement permits the grower to cultivate a field of young plants where there might be eight inches of clearance between the left and right cultivating tool, and then move to a field where the crop is being raised on a bed covered with black plastic. In the field of plastic culture vegetables the distance between the cultivating tools require adjustment to an operating spacing of forth inches. This transition between fields can be done without the need to make time consuming, manual adjustments with tools. If necessary, an addition twenty-four inches of lateral spacing of the work implements 35 can be attained by manually positioning the work implements 35 on the rotational control plate 30 by sliding the work implements 35 with the fasteners 32 riding in the slotted frame 36; however, tools would be required to make this particular lateral adjustment of the work implements 35.

In addition to the hydraulic adjustment features, there are some improvements to the manual adjustments. The angle at which the rolling cultivators 38 roll through the soil is adjustable through rotation of the work implement 35 relative to the rotational control plate 30 and clamping the work implement 35 to the plate 30. This particular angular adjustment is typical with respect to the manner in which the rolling cultivators 38 are commonly used. The pitch at which the rolling cultivator 38 is operated is also adjustable by pivoting the upright mounting member 21 relative to the tilt control plate 25. A pin 27 is placed through the upright mounting member 21 into the plate 25 to lock the upright member 21 into the desired position. This tilt adjustment permits the selection of pitch angles at five degree intervals for the cultivator mounted on the bottom of the upright mounting member 21. The tilt adjustment is done quickly and without requiring tools. The engagement of the pin 27 between the upright member 21 and the tilt control plate 25 prevents slippage that can be found in cylindrical clamping members.

The sequence of the different types of work implements 35 attached to the sub-frames 15 is also of significant importance, especially for an application of the cultivating implement 10 in growing strawberries on what is referred to as the matted row system. The matter row system of growing strawberries amounts to a row of plants and daughter plants which have become established in a field. Two cultivating actions become necessary during the growing season. The first cultivating action is conducted to control excess growth of the strawberry plants as the plants make runners, which if left uncontrolled, can produce a solid mat of plants covering the entire field. With the cultivating implement incorporating the instant invention, coulter disks or rolling cultivators 37, particularly conventional notched disks in the forward position on the sub-frame 15 can be utilized to cut off excess runners and move the severed runners away from the plant row. The disks and rolling cultivators 37 exist as opposing pairs, a right and a left, and are used on both sides of the row. The coil tine 39 or s-tine follows the coulter disk implement 37 to loosen soil at a deeper level to assist water penetration if rain follows cultivation. The rolling spider cultivator 38 then moves some soil back toward the plants in order to level the ground and keep soil around the root zone of the strawberry plants. The use of the rolling spider tine cultivator 38 following the coil shank 39 or s-tine can also be effective to remove debris which might drag behind the shank 39.

The second cultivation action common to growing strawberries in the matted row system is referred to as renovation. Following harvest of the fruit, the row of plants is again narrowed, weeds are removed, and the straw between the rows is incorporated into the soil. The configuration of this cultivator with the coulter disks 37 or rolling cultivators cutting plants and residue away from the row followed by a movement of soil back toward the row has proven to be uniquely featured aspect of the instant invention. These features in conjunction with the hydraulic width adjustment which permits a first pass through the field with the cultivators at a wider setting followed by a second pass through the field allows the grower to bring the row back to a desired width with a minimum of manual adjustment of the work implements 35.

The incorporation of a pivoting point 12a between the main frame 12 of the cultivator 10 and the apparatus connecting the cultivating implement 10 to the three-point hitch lift arms of the tractor provides improved operation of the cultivating implement 10 on hill sides, i.e. non-level ground. The hydraulic cylinder 19 attached between the cultivator main frame 12 and the pivoting hitch member 11a allows the operator to shift the cultivator 10 in an uphill direction. Two things are accomplished by such pivotal movement of the main frame 12. First, the angle is increased at which the rolling cultivators 38 on the down hill side of the row encounters the soil which helps move soil toward the row from the lower side. At the same time the angle of the rolling cultivator on the uphill side of the row is decreased causing less soil to be moved downhill toward the row. Secondly, a tillage implement 10 pulled behind the tractor in side hill conditions tends not to follow directly behind the tractor. The hillside hitch allows the cultivating implement to be shifted to the left or right of the path covered by the tractor. This hillside compensating hitch can add to the versatility of the cultivator where hills and contour farming are being utilized.

The cultivator described above is designed to straddle the row of plants being cultivated. The main frame 12 is also designed to accept the mounting of an additional set of work implements 35 at the center of the main frame 12 if the operator desires to cultivate two rows of crop simultaneously.

An alternative embodiment 60 of the cultivating implement is designed primarily for cultivating blueberries where the tractor and cultivator 10 are operated between two rows of bushes. For this purpose the forward and rearward transverse frame members 13, 14 of the main frame 12 are constructed of steel tube. The two sub-frames 15 are constructed of slightly smaller steel tubes in a general U-shaped configuration. A sub-frame 15 is mounted for sliding movement into the right and left sides of the main frame 12. The sub-frames 15 telescope in and out of the main frame 12 and are positionable by hydraulic cylinders 62.

This telescoping ability of the sub-frames 15 permits the operator to adjust the overall operating width of the implement 60, i.e. the distance between the outer edges of the work implements 35. This design allows the cultivating implement 60 to be used in fields where the plants have been raised at some variation with respect to row spacing, or to cultivate plants of different ages which have substantial differences in the amount of encroachment into the open space between rows of crop. In the particular situation of cultivating blueberries, it is necessary for the frame of the cultivator to be adjusted for larger plants or limbs of the plant would be broken due to impact with the cultivator.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A cultivating implement comprising:
   a main frame adapted for movement over the surface of the ground, said main frame having longitudinally spaced forward and rearward transverse frame members interconnected with at least one longitudinally extending frame member;

a pair of transversely opposed sub-frames supported on said main frame for sliding movement relative to said main frame;

at least one ground engaging work implement supported on each respective said sub-frame and arranged in a corresponding laterally opposed orientation; and an actuator operatively coupled to each said sub-frame to affect selective lateral movement of each said sub-frame in opposing lateral directions relative to said main frame to selectively vary a transverse spacing between said corresponding laterally opposed work implements.

2. The cultivating implement of claim 1 wherein each said work implement is supported on a mounting mechanism carried by the corresponding said sub-frame, said mounting mechanism being pivotable about a horizontal, longitudinally extending pivot axis to affect a tilting movement of said work implement relative to said main frame.

3. The cultivating implement of claim 2 wherein said mounting mechanism includes a tilt control plate to control the tilting movement of said work implement.

4. The cultivating implement of claim 2 wherein said mounting mechanism rotatably supports said work implement for rotational movement in a generally horizontal plane about a generally vertical pivot axis.

5. The cultivating implement of claim 4 wherein said mounting mechanism includes a rotational control plate supporting said work implement and limiting said rotational movement of said work implement about said generally vertical pivot axis.

6. The cultivating implement of claim 5 wherein said rotational control plate is formed with a pair of opposing slotted openings through which fasteners supporting said work implement pass to connect said work implement to said rotational control plate.

7. The cultivating implement of claim 6 wherein said work implement is formed with a slotted frame carrying said fasteners, said slotted frame being laterally movable relative to said rotational control plate independently of said rotational movement.

8. The cultivating implement of claim 1 further comprising a pivot linkage interconnecting said main frame and each said sub-frame, said actuator being connected to said pivot linkage to affect sliding movement of both said sub-frames simultaneously.

9. The cultivating implement of claim 8 wherein said pivot linkage comprises:

a central pivot link pivotally supported by said main frame, said actuator being operatively connected to said central pivot link to affect pivotal movement thereof; and a pair of lateral pivot links, each said lateral pivot link interconnecting an end of said central pivot link with a corresponding one of said sub-frames.

10. The cultivating implement of claim 1 wherein each said sub-frame carries a rotatable brush attachment on an inner side of said sub-frame, said rotatable brush attachment being engagable with the ground to cause a dislodging of weeds from the ground adjacent a row of crop.

11. The cultivating implement of claim 1 wherein said actuator includes first and second hydraulic actuators interconnecting, respectively, said transversely opposing sub-frames.

12. In a cultivator having a main frame adapted for movement over the surface of the ground, said main frame supporting ground engaging work implements, the improvement comprising:

a pair of transversely spaced sub-frames on which said ground engaging work implements are mounted, said main frame including forward and rearward transverse frame members slidably receiving said sub-frames for lateral movement thereof relative to said main frame, each said sub-frame having at least one of said ground engaging work implements mounted thereon to define a transverse spacing therebetween;

an actuator mechanism interconnecting said main frame and said sub-frames to affect said lateral movement of said sub-frames to adjust selectively said transverse spacing between said work implements and;

a pivot linkage interconnecting said main frame and each said sub-frame, said actuator being connected to said pivot linkage to affect sliding movement of both said sub-frames in opposing lateral directions simultaneously.

13. The cultivator of claim 12 wherein each said sub-frame carries a mounting apparatus on which the corresponding said work implement is mounted, said mounting apparatus including:

an upright mounting member pivotally supported on said sub-frame for pivotal movement about a horizontal longitudinally extending pivot axis; and a rotation control plate affixed to said upright mounting member, said work implement being supported on said rotation control plate by fasteners such that said work implement is rotatable relative to said rotation control plate to a desired rotated position whereupon said fasteners can lock said work implement into said desired rotated position for operation.

14. The cultivator of claim 13 wherein said work implement is laterally movable relative to said rotation control plate to a desired lateral position, said fasteners being operable to lock said work implement in said desired lateral position.

15. The cultivator of claim 13 wherein said mounting apparatus further includes:

a tilt control plate affixed to said sub-frame adjacent said upright mounting member, said tilt control plate having at least two apertures formed therein to align with a hole through said upright mounting member for receiving a connector therethrough to lock said upright mounting member in a selected pivoted position.

16. The cultivator of claim 12 wherein said actuator mechanism includes:

a pivot linkage pivotally supported on said main frame and being connected to each respective sub-frame to cause simultaneous lateral movement of said sub-frames in response to the pivotal movement of said pivot linkage; and a hydraulic cylinder anchored on said main frame and connected to said pivot linkage to control said pivot movement of said pivot linkage.

17. The cultivator of claim 12 wherein said sub-frames also support a rotatable brush attachment positioned along an interior side of each said sub-frame, said rotatable brush being operatively powered in rotation by a motor.

18. A cultivating implement comprising:

a main frame adapted for movement over the surface of the ground, said main frame having longitudinally spaced forward and rearward transverse frame members interconnected with at least one longitudinally extending frame member;

a pair of transversely opposed sub-frames supported on said main frame for sliding movement relative to said main frame;

at least one ground engaging work implement supported on each respective said sub-frame; and first and second hydraulic actuators interconnecting, respectively, said transversely opposing sub-frames to affect selective lateral movement of said sub-frames relative to said main frame to permit a transverse spacing between said work implements to be selectively varied.

19. The cultivating implement of claim 18 further comprising:

a three-point hitch mounting apparatus for connection of said cultivating implement to a prime mover, said main frame being pivotally connected to said mounting apparatus; and a third hydraulic actuator operatively interconnecting said main frame and said mounting apparatus to affect pivotal movement of said main frame relative to said mounting apparatus to skew said main frame relative to said three point hitch mounting apparatus to compensate for side hill positioning of said main frame.

20. The cultivating implement of claim 18 wherein each said sub-frame carries a mounting apparatus on which the corresponding said work implement is mounted, said mounting apparatus including:

an upright mounting member pivotally supported on said sub-frame for pivotal movement about a horizontal longitudinally extending pivot axis; and a rotation control plate affixed to said upright mounting member, said work implement being supported on said rotation control plate by fasteners such that said work implement is rotatable relative to said rotation control plate to a desired rotated position whereupon said fasteners can lock said work implement into said desired rotated position for operation.

* * * * *